United States Patent [19]

Matumoto et al.

[11] 4,164,653
[45] Aug. 14, 1979

[54] SOLVENT FOR THE EXTRACTION OF OIL FRACTION IN WATER

[75] Inventors: Syozo Matumoto, Kyoto; Mitsuhiro Okamoto, Neyagawa, both of Japan

[73] Assignees: Horiba, Ltd., Kyoto; Daikin Kogyo Co., Ltd., Osaka, both of Japan

[21] Appl. No.: 855,906

[22] Filed: Nov. 29, 1977

[30] Foreign Application Priority Data

Dec. 8, 1976 [JP] Japan .................. 51-148085

[51] Int. Cl.$^2$ ............................................. G01T 1/167
[52] U.S. Cl. ................................. 250/301; 250/304; 250/343
[58] Field of Search ............... 250/301, 304, 343; 252/364

[56] References Cited

U.S. PATENT DOCUMENTS 4,045,671  8/1977  Dille et al. .................. 250/343 X

*Primary Examiner*—Davis L. Willis

*Attorney, Agent, or Firm*—Wenderoth, Lind & Ponack

[57] ABSTRACT

The present invention relates to a solvent primarily composed of a low polymer of chlorotrifluoroethylene for the extraction of an oil fraction in water and measuring the concentration of the oil fraction in water by solvent extraction in the infrared absorption method. The low polymers of chlorotrifluoroethylene contemplated as a solvent herein may be a single polymer or a mixture of polymers of different degrees of polymerization as shown in the following formulae:

$$X \cdot (CF_2 - CFCl)_n \cdot X$$

or $$[CF_2 - CFCl]_2,$$

wherein both atoms represented by X in the first chemical formula are the same or different from each other and X is a chlorine or fluorine atom, and n is 2 or 3.

6 Claims, 3 Drawing Figures

SOLVENT FOR THE EXTRACTION OF OIL FRACTION IN WATER

The present invention relates to a solvent for the extraction of an oil fraction in water, which is effectively used in an automatic, continuously or intermittently measuring apparatus (hereinafter called simply the apparatus) for the determination of an oil fraction in water. The invention provides a solvent which is safe to the human body and shows very little poisonous properties.

DESCRIPTION OF THE PRIOR ART

As the method of measuring an oil fraction contained in water, methods have hitherto been used such as (1) the solvent extraction-infrared absorption method; (2) the turbidity method; (3) the ultra-violet absorption method; (4) the fluorophotometric method, and (5) the n-hexane-weighing method. Among them, the solvent extraction-infrared absorption method (1) has often recently been used for the determination of the concentration of an oil fraction in water. With such method, it is possible to very accurately determine the concentration even if there exists only a small amount of oil in water. The purpose of the present invention is to provide a solvent which can be used in the apparatus constructed for use with the solvent extraction-infrared absorption method.

BACKGROUND OF THE INVENTION

As an example of a solvent to be used in the solvent extraction-infrared absorption method, carbon tetrachloride (hereinafter, this solvent will be shown as $CCl_4$) is a well known substance. However, regarding the use of $CCl_4$, the following two points should be noted. That is, its threshold limited value (hereinafter referred to as TLV) to the environmental atmosphere where it is practically used is only 10 ppm and its lethal dose (defined as the amount of poisonous substance which kills 50% of test animals when administered orally (hereinafter referred to as $LD_{50}$)) is 9.6 g/kg. Therefore, the use of $CCl_4$ in a limited space such as in a ship is especially undesirable.

With such a background, the availability of 1,1,2-trichloro-1,2,2-trifluoroethane ($CCl_2F-CClF_2$, hereinafter called Flon-113) belonging to a series of fluorocarbon compounds has been recognized as a good solvent to be used in place of $CCl_4$. That is, since the poisonous property of Flon-113 is so weak, its TLV being 1000 ppm and $LD_{50}$ being 40 g/kg of a mouse's body, it is used as an important solvent in dry cleaning. Also, it is very often used as a solvent for the deoiling of a metal surface. Moreover, it is reported that Flon-113 is an effective solvent for use in the extraction of an oil fraction in water, since it has a large ability to dissolve oily substances in water, almost equal to that of $CCl_4$. Furthermore, it has a characteristic behavior such that it does not absorb any infrared spectrum in the neighborhood of 2900 $cm^{-1}$, which corresponds to a characteristic infrared absorption due to the existence of hydrocarbons (in the present case, the main skeleton of oil fractions in water can be considered to be hydrocarbon).

However, on the other side, even if Flon-113 is taken into consideration as a solvent to be used in the apparatus based upon the solvent extraction-infrared absorption method, its low boiling point (+47.6° C.) is a hindrance to its use for such a purpose. In the temperature range from 0° to 50° C. which is the probable air temperature at which the measuring apparatus is operated, Flon-113 has a large vapor pressure. Accordingly, it is fugacious. For example, at a temperature higher than 30° C., the vapor pressure of Flon-113 is more than three times of that of $CCl_4$ and this large vapor pressure will surely bring about an inevitable escape of Flon-113. Moreover, the interface between the solvent and the aqueous layer becomes indistinct, resulting in an ineffective separation of the two layers. Furthermore, since the temperature of a Flon-113 solution in a cell increases to near its boiling point during a measurement by the absorption of infrared spectra, this will again enlarge the error in the determination of oil content. Therefore, Flon-113 can never be practically used as a solvent in such apparatus.

After such an experimental confirmation as mentioned above, the present inventors have made a series of experimental tests on other chlorinated hydrocarbons such as 1,1,2,2-tetrachloro-1,2-difloroethane ($CCl_2F-CCl_2F$, hereinafter called Flon-112) and tetrachloroethylene, which have a higher boiling point than Flon-113. However, the conclusion was that both compounds cannot be used as the solvent for the present purpose based upon the reason that the freezing point of the former is too high (+26° C.) and it is in a solid state at ordinary temperatures. Further, the latter compound contains hydrocarbon skeletons originating from the existence of phenol resins and propylene oxide which are ordinarily added in order to increase its chemical stability.

SUMMARY OF THE INVENTION

After an extensive study on chlorinated fluorohydrocarbons, the present inventors have, fortunately, found that noncombustible low polymers, which can be obtained by a dimerization or a teromerization of a chlorotrifluoroethylene monomer having a boiling point of more than 100° C., a freezing point lower than −100° C. and a molecular weight lower than 450, can be effectively used as the solvent for the extraction of an oil fraction in water in a broad range of operating temperatures using said apparatus. Moreover, they have found that the poisonous property of those low polymers is very weak under the circumstances where they are used. That is to say, the instant invention has been accomplished by the discovery of the present inventors that said low polymers of chlorotrifluoroethylene are very desirable to use as solvents in a measuring apparatus based upon the solvent extraction-infrared absorption method. Moreover, such solvents have only very weak poisonous properties.

DESCRIPTION OF THE DRAWINGS

FIG. 1-(b) shows infrared absorption spectra by the same solvent when B-grade heavy oil is dissolved in it.

DESCRIPTION OF THE PREFERRED EMBODIMENTS

A low polymer of chlorotrifluoroethylene monomer which, hitherto, has been available on the market, has been used mainly as a lubricating oil since it has such properties as a mean molecular weight of 500 to 1300, its mechanical behavior is very much like that of grease and, moreover, its anti-thermal properties are quite superior. However, such polymer has not yet been considered to be useful as a solvent since its viscosity is too high. In such a situation, of course, no one could anticipate that low polymers of chlorotrifluoroethylene, whose molecular weight is lower than that of the conventional one, could be used as the solvent for the extraction of oil fraction in water for the determination of oil concentration in water using said apparatus.

The low polymer of chlorotrifluoroethylene of the present invention, which can be used as the solvent for the extraction of an oil fraction in water using said measuring apparatus based upon the solvent extraction-infrared absorption method, is a dimer or trimer of chlorotrifluoroethylene or a mixture thereof as shown in the following chemical formulas:

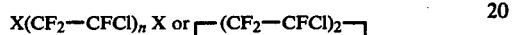

wherein the both atoms represented by X in the former formula are the same or different from each other and X is a chlorine or fluorine atom and n is 2 or 3.

Figure 1:
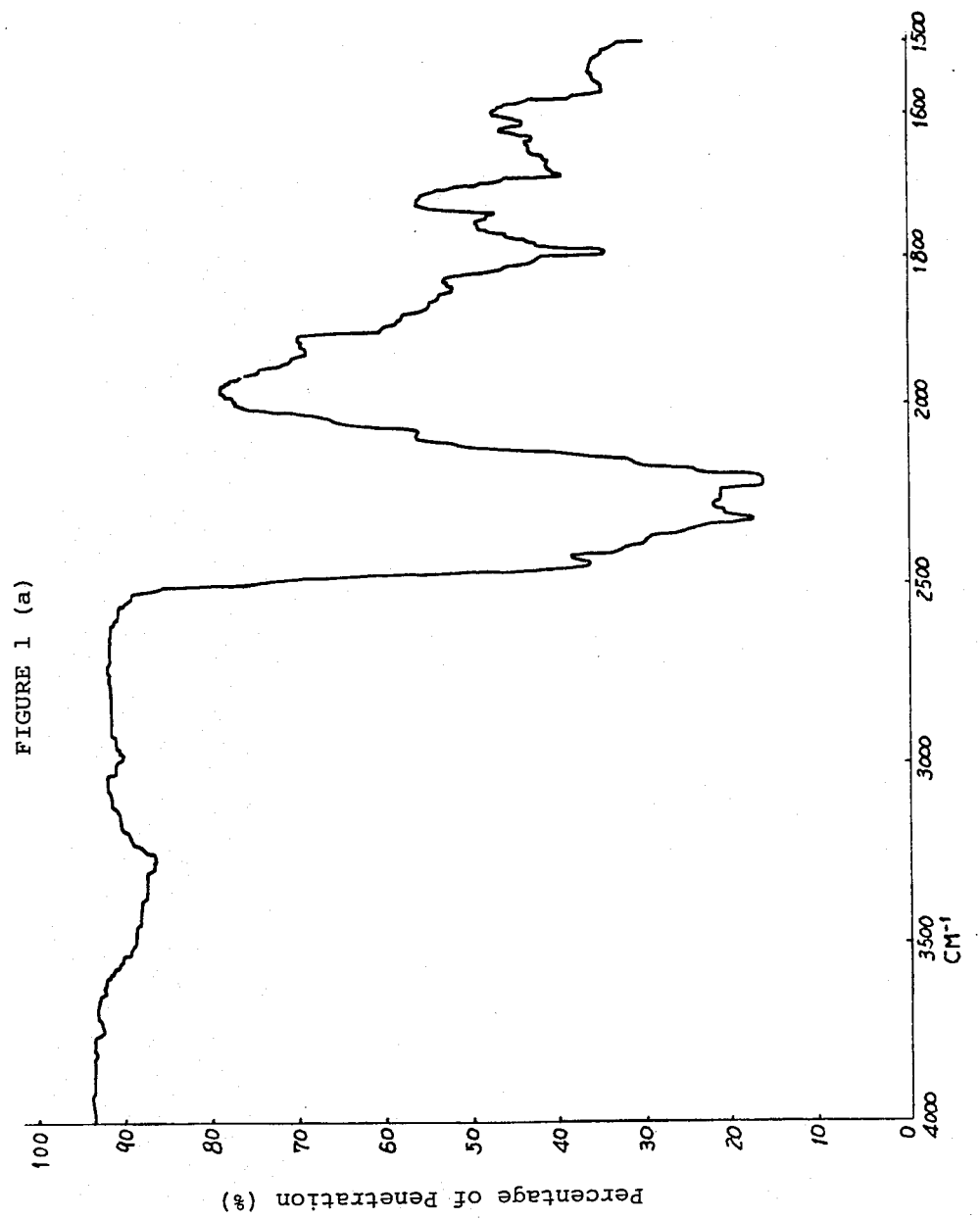
FIG. 1-(a) shows infrared absorption spectra only by a solvent of the present invention.
Figure 1:
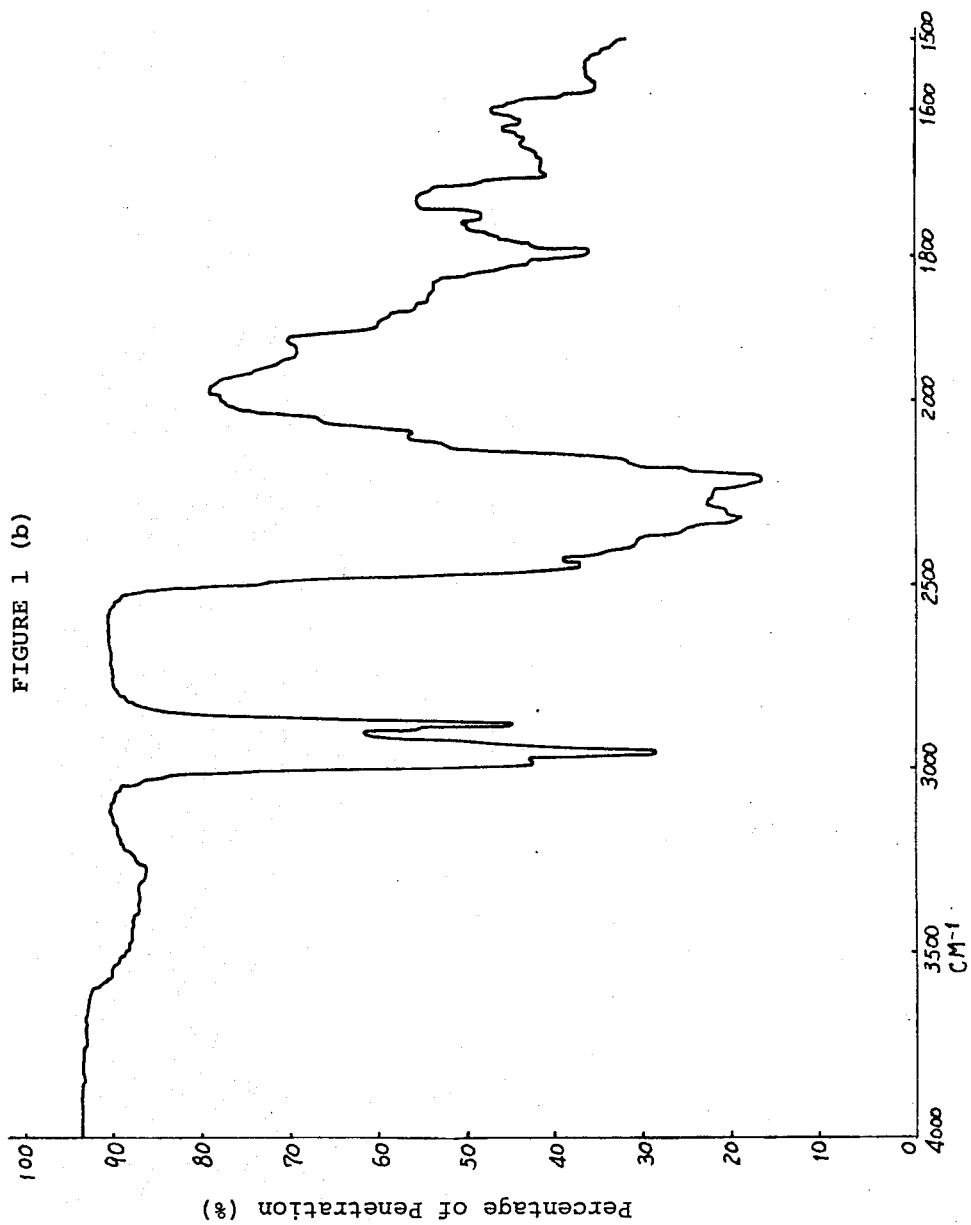

Next, in the following, the characteristic properties of a dimer, whose chemical formula is $Cl(CF_2-CFCl)_2Cl$ (hereinafter, compounds of the present invention will be shown in each corresponding chemical formula), as a typical example among those low polymers of chlorotrifluoroethylene monomer of the present invention, will be pointed out since this dimer is considered to be the most practical one to use in the present invention. At the same time, the characteristic properties of such dimer will be compared with those of other compounds as shown in Table 1. Moreover, in FIG. 1(a), the infra- 113, generally, and sometimes the former is larger than the latter.
3. The dimer can be used in a broad range of temperatures, since its boiling point is +134° C. and its freezing point is −143° C.
4. The dimer is chemically very stable to water, oils, acids, alkalis, etc.
5. The formation of a discrete interface between water and a solution of the dimer after the extraction of oil always happens in the range of operation temperature of from 0° to 50° C. and accordingly, the separation of the two phases is accurately possible.
6. The viscosity of the dimer is low, i.e. 0.96 cSt.
7. The mutual solubilities between the dimer and water are very low and especially, the solubility of the dimer in water is so small such as about 1/40 that of Flon-113 in water at 25° C., and 1/180 of that of $CCl_4$. Thus, the loss of the solvent is very small. On the other side, the solubility of water in the dimer is very small as shown in Table 2. Such a small solubility of water in the dimer as shown in Table 2 makes it possible to carry out an infrared absorption measurement without carrying out tedious treatments, such as the removal of water, since the effect on the absorption measurement of such a small amount of water is negligible. This is surely an advantage of the present invention.
8. The vapor pressure of the dimer is low and on the other side, the poisonous properties of the dimer is weak. As shown in Table 1, the vapor pressure of the dimer at 25° C. is 11.5 mmHg and this value corresponds to about 1/30 of that of Flon-113 and to about 1/10 that of $CCl_4$. The observed $LD_{50}$ was more than 40 g/kg of a mouse's body. This is almost equal to that of Flon-113, showing rather a faint poisonous behavior of the dimer of the present invention.

TABLE 1

|  | Molecular Weight | Specific Gravity at 25° C. (g/cc) | Boiling Point (°C.) | Vapor Pressure (mmHg) | | Freezing Point (°C.) | Viscosity (cSt) at 25° C. | Mutual Solubility to water at 25° C. (ppm) | |
|---|---|---|---|---|---|---|---|---|---|
|  |  |  |  | at 25° C. | at 50° C. |  |  | Solubility of water to solvent | Solubility of solvent to water |
| $CCl_4$ | 154 | 1.59 | 76.7 | 110 | 310 | −22.9 | 0.63 | 130 | 800 |
| Flon-113 | 187.5 | 1.57 | 47.6 | 360 | 800 | −35 | 0.42 | 110 | 170 |
| Flon-112 | 204 | 1.63 | 92.8 | 60 | 172 | 26 | — | — | 120 |
| Linear Dimer of Chlorotrifluoroethylene $Cl(CF_2-CFCl)_2Cl$ | 304 | 1.75 | 134 | 11.5 | 38 | −143 | 0.96 | 48 | 4.5 |
| Trimer of Chlorotrifluoroethylene $Cl(CF_2-CFCl)_3Cl$ | 420.5 | 1.84 | 203 | 0.5 | 1.8 | −108.5 | 2.46 | 43 | 4.1 |
| Cyclic Dimer of Chlorotrifluoro- ⌐(CF₂—CFCl)₂⌐ | 233 | 1.64 | 599 | 250 | 580 | −24 | — | 40 | 4.5 | red absorption spectra of said dimer and in FIG. 1(b), the infrared absorption spectra of a solution of the dimer containing B-grade heavy oil are respectively shown. The characteristic properties of $Cl(CF_2-CFCl)_2Cl$ are as follows:
1. The intensity of the infrared absorption of the dimer in the neighborhood of 2,900 $cm^{-1}$ is so weak as to be negligible.
2. The solubility of an oily substance in the dimer is almost equal to that of such oily substance in Flon-

TABLE 2

| | Solubility of water to solvent (ppm) | | | |
|---|---|---|---|---|
| | at 5° C. | at 25° C. | at 40° C. | at 60° C. |
| $CCl_4$ | 60 | 130 | 220 | 300 |
| Flon-113 | 50 | 110 | 230 | — |
| $Cl(CF_2-CFCl)_2Cl$ | 45 | 48 | 55 | 83 |
| $Cl(CF_2-CFCl)_3Cl$ | 40 | 43 | 48 | 65 |

From the above, it can now be clearly understood that the linear dimer Cl(CF$_2$—CFCl)$_2$Cl not only satisfies all important conditions necessary for the solvent to be used in the extraction of oil fraction in water, but also is safe to the human body and, moreover, scarcely behaves as a poisonous substance.

The preparation of the low polymers of chlorotrifluoroethylene of the present invention can be carried out in the following way:

For the production of the linear dimer and trimer, a teromerization reaction of chlorotrifluoroethylene is carried out, at first, in the presence of a terogen such as a sulfuryl chloride (SO$_2$Cl$_2$) and then, they are separated by a fractional distillation of the obtained teromer as the reaction product. If desired, two chlorine atoms at both ends of the dimer or trimer molecule as exemplified above, may be substituted by two fluorine atoms using a fluorination agent such as trifluorocobalt (CoF$_3$). Furthermore, the preparation of the cyclic dimer

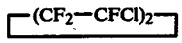

can be easily achieved by a treatment of the chlorotrifluoroethylene at high pressure.

Figure 2:
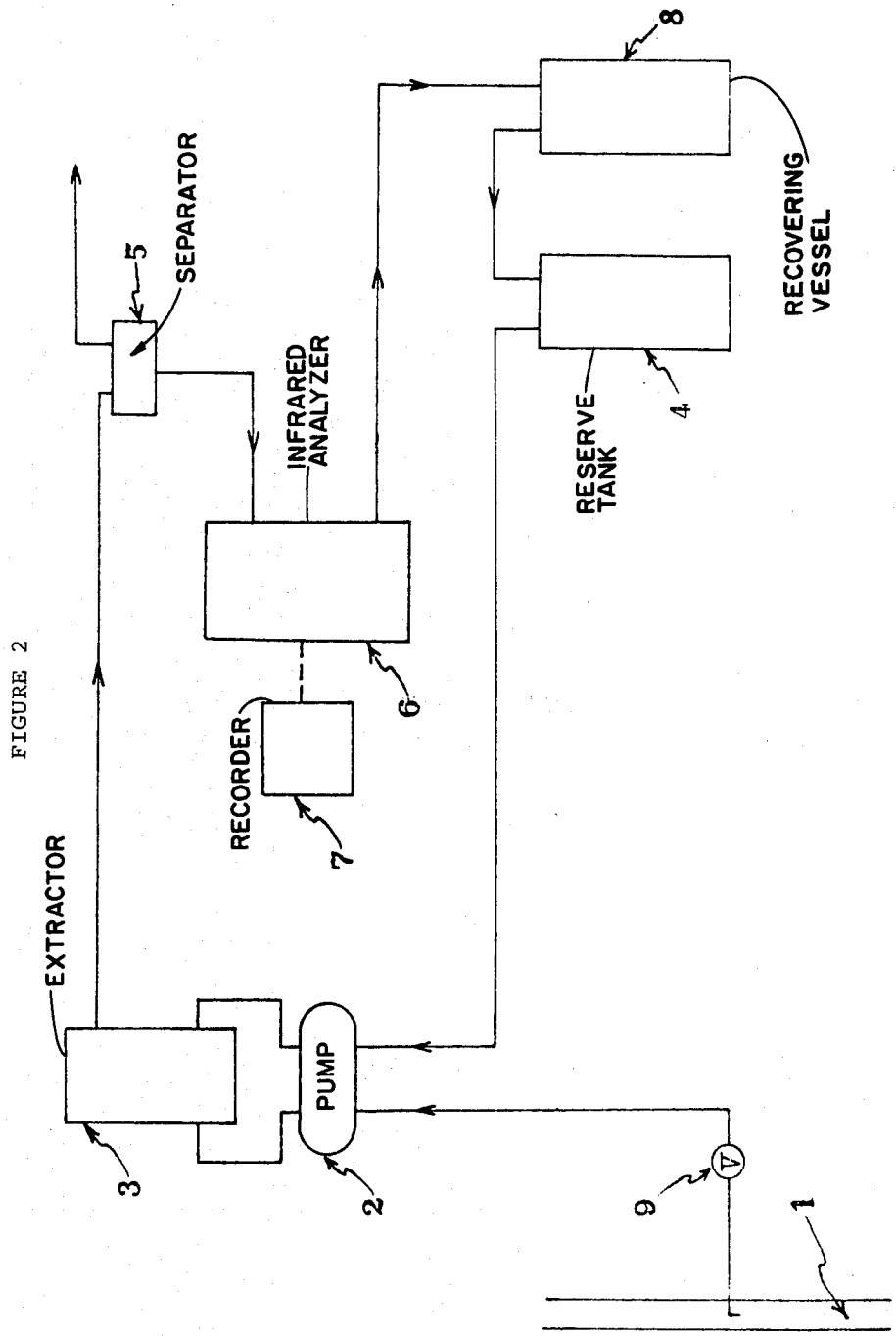
FIG. 2 shows a flow sheet of an automatic measuring apparatus for the determination of the oil content in water, wherein 3 is an extractor, 5 is a separator and 6 is an infra-red analyzer.

In the following, an example of how to apply the solvent of the present invention will be explained with regard to FIG. 2, wherein FIG. 2 is a flow sheet of an automatic measuring apparatus for a continuous operation based upon the solvent extraction-infrared absorption method.

A sample water taken from a drain pipe 1 belonging, for example, to an oil-water separator is introduced to an extractor 3 through a valve 9 and a pump 2. On another side, the solvent of the present invention is introduced from a reserve tank 4 to the extractor 3 through the pump 2. In the extractor 3, the sample water and the solvent of the present invention are intimately mixed together by agitation to extract the oil fraction in the water with the solvent. The mixture taken out of the extractor 3 is sent to a separator 5 and the two phases, the water and the solvent contained with the oil fraction, are separated, and only the latter medium is introduced into an infrared analyzer 6. The result of measurement by the infrared analyzer 6 is recorded in a recorder 7 and the solvent medium which has already been analyzed spectroscopically in the analyzer 6 is sent to a recovering vessel 8 and the solvent is separated from the oil contained in it. The recovered solvent is again introduced into a reserve tank 4 for a repeated use in the continuous analytical operation.

As explained above, since the solvent circulates in a closed system of the apparatus without leaving the system, it scarcely escapes from the system on its own, because its boiling point is high and accordingly its vapor pressure is low. Thus, it is possible to carry out a continuous automatic measurement of the oil content in water for a long period of time without supplying the solvent to the apparatus. Moreover, it must be pointed out that since the solvent of the present invention is never exhausted from the closed system of the apparatus and since the solubility of the solvent in water is much smaller than that of CCl$_4$ in water, the present invention makes it possible to provide an advantageous apparatus from an economic standpoint and also allows for easy preservation. Of course, it is also possible to apply the solvent of the present invention into an automatic measuring apparatus which is operated intermittently.

Next, in Table 3, analytical results will be shown, wherein a series of measuring experiments were carried out on the same sample water, applying CCl$_4$, Flon-113 and Cl(CF$_2$—CFCl)$_2$Cl onto the apparatus shown in FIG. 2 at the same operating conditions. The sample water was a sea water containing about 13 ppm of two different heavy oils (B-grade heavy oils).

TABLE 3

| No of repeated measurements (solvent) | CCl$_4$ | Flon-113 | Cl(CF$_2$—CFCl)$_2$Cl |
|---|---|---|---|
| 1 | 12.8 ppm | 10.9 ppm | 2.1 ppm |
| 2 | 12.7 ppm | 11.2 ppm | 12.1 ppm |
| 3 | 12.8 ppm | 11.2 ppm | 12.2 ppm |

From the data shown in Table 3, it can be clearly understood that the ability of the low polymer of chlorotrifluoroethylene to extract the oil fraction from the sea water is more superior than that of Flon-113 when they are used at ordinary conditions. The ability of the solvent of the present invention is almost equal to that of CCl$_4$.

That is to say, only from the standpoint of solvent power to the oil fraction in water, the low polymer of the present invention should be evaluated to be a superior solvent for the quantitative analysis of oil fractions contained in water using said apparatus, comparable to the superiority of the solvent power of CCl$_4$.

As explained in detail above, the invention of the present application makes it possible to provide a solvent which can be effectively used for the extraction of oil fractions in water in the apparatus based upon the solvent extraction-infrared absorption method. Moreover, the aforementioned physical characteristics of the solvent of the present invention makes it possible to operate the solvent extraction-infrared absorption method in a closed atmospheric condition such as in a ship. Therefore, the low polymers of the present invention are expected to play an important role as the new solvent for the extraction of an oil fraction in water.

What is claimed is:

1. In a method for extracting and measuring the concentration of an oil fraction in water which comprises extracting the oil from a water sample with a solvent and analyzing the concentration of oil in the solvent by means of an infrared analyzer, the improvement wherein the solvent utilized to extract the oil from the water sample consists essentially of a low polymer of chlorotrifluoroethylene.

2. The improvement according to claim 1, wherein said low polymer of chlorotrifluoroethylene is a single polymer or any mixture of polymers of different degrees of polymerization as shown in the following chemical formulae:

$$X \cdot (CF_2—CFCl)_n \cdot X$$
or
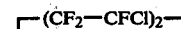

wherein both atoms represented by X in the first chemical formula are the same or different from each other and X is a chlorine or fluorine atom, and n is 2 or 3.

3. The improvement according to claim 2, wherein the chemical structure of said low polymer of chlorotrifluoroethylene is Cl(CF$_2$—CFCl)$_2$Cl.

4. In a method for extracting and measuring the concentration of an oil fraction in water by the solvent extraction in the infrared-absorption method, which comprises introducing a water sample containing oil and a solvent for the oil into an extractor to extract oil from the water sample, introducing the combined mixture into a separator to permit the entire mixture to separate into an aqueous and a solvent-oil extract phase, and then introducing the solvent containing the oil-extract into an infrared analyzer; the improvement wherein the solvent utilized to extract the oil from the water sample consists essentially of a low polymer of chlorotrifluoroethylene.

5. The improvement according to claim 4, wherein said low polymer of chlorotrifluoroethylene is a single polymer or any mixture of polymers of different degrees of polymerization as shown in the following chemical formulae:

or

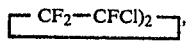

wherein both atoms represented by X in the first chemical formula are the same or different from each other and X is a chlorine or fluorine atom, and n is 2 or 3.

6. The improvement according to claim 5, wherein the chemical structure of said low polymer of chlorotrifluoroethylene is $Cl(CF_2-CFCl)_2Cl$.

* * * * *